July 20, 1937.  G. E. BIGELOW ET AL  2,087,313
SEAL FOR ROTATING SHAFTS
Filed July 20, 1936
Fig. 1.
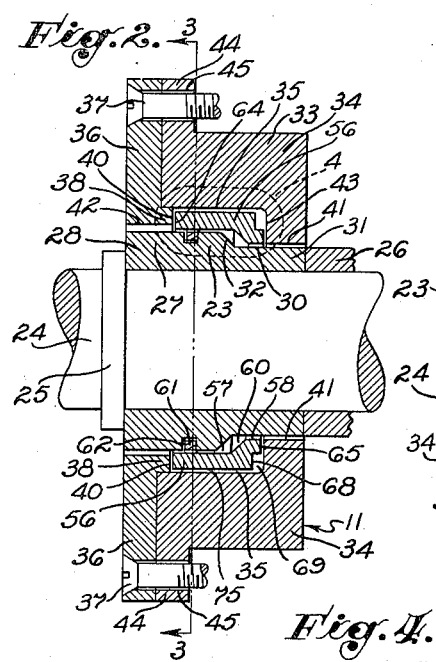
Fig. 2.
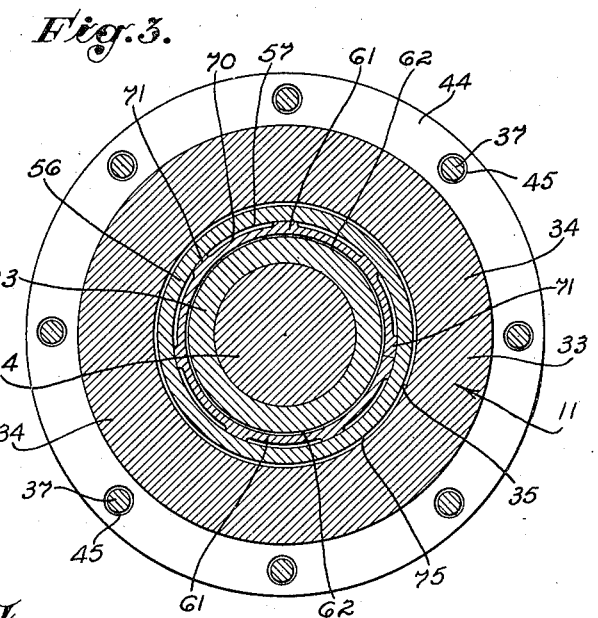
Fig. 3.
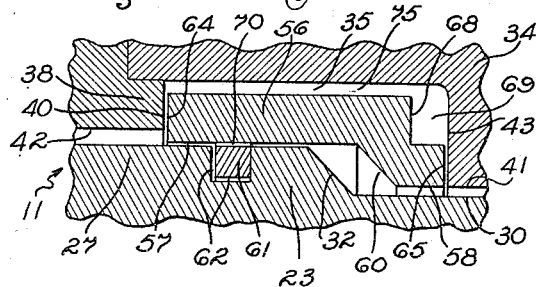
Fig. 4.
INVENTORS
GEORGE E. BIGELOW
ARTHUR R. WEIS
BY
ATTORNEY.

Patented July 20, 1937

2,087,313

UNITED STATES PATENT OFFICE 2,087,313

SEAL FOR ROTATING SHAFTS

George E. Bigelow, Southgate, and Arthur R. Weis, Huntington Park, Calif., assignors of one-half to Pacific Pump Works, Huntington Park, Calif., a corporation of California Application July 20, 1936, Serial No. 91,516

3 Claims. (Cl. 286—9)

Our invention relates to a sealing device especially adapted for use around a shaft which projects from a chamber or device containing a liquid under high pressure and having substances therein which tend to deposit when the liquid is substantially without movement or agitation.

The invention is especially useful in high pressure oil pumps of the character employed to pump hot oils from one stage of a refining process to another. Superheated fluids, such as hot oil at high pressure, are found to be relatively destructive to packing materials employed at the high pressure ends of hot oil pumps, and accordingly it is customary to form a separate pressure chamber between the high pressure stage of the pump and the packing device through which the pump shaft extends to the exterior, this chamber being connected to the intake of the pump so that the pressure therein, and likewise the fluid pressure exerted on the packing device, will be much lower than the discharge pressure of the pump, and therefore the packing device will not be subjected to the severe working conditions encountered where the pressure reducing chamber is not employed between the high pressure stage of the pump and the packing device. As shown in the Weis et al. Patent No. 2,007,414, a flow restricting device or throttle valve may be employed around the shaft where it passes from the high pressure space or stage of the pump to the above mentioned pressure releasing chamber. This throttle valve has a sealing part of annular character which operates in balanced condition in an annular chamber and is accordingly automatically adjusted to an intermediate position so that the wear on the valve-forming portions or faces of this sealing part will be practically eliminated owing to the fact that there is a material film of oil across these faces during the operation of the pump. It is found that this form of throttle valve operates substantially without friction and without wear so long as the annular sealing part referred to does not become fixed or cemented to one of the parts cooperating therewith as the result of the deposit of carbon from hot oil.

It is an object of our present invention to provide an improvement in a throttle valve of the above character having parts so formed that a small flow of fluid is at all times conducted through the spaces where carbon tends to deposit, thereby practically preventing the deposit of carbon which will cement one of the cooperating parts to another so that a free and automatic adjustment thereof cannot take place.

Further objects and advantages of the invention will be made evident throughout the following part of the specification.

Referring to the drawing, which is for illustrative purposes only,

Fig. 1 is a partly sectioned view of a hot oil pump, showing the preferred manner of use of the invention.

Fig. 2 is an enlarged sectional view of a preferred form of the sealing device disclosed in Fig. 1.

Fig. 3 is a cross section on a plane represented by the line 3—3 of Fig. 2.

Fig. 4 is a fragmentary enlarged section of the area of Fig. 2 enclosed by the dotted line 4 therein.

In Fig. 1 of the drawing we show a high pressure hot oil pump 10 having a throttle or sealing device 11 disposed between the high pressure zone or space 12 of the pump 10 and a low pressure space or pressure relieving chamber 14 formed adjacent the inner end of a packing device 15 of customary form having rings of packing material 16 compressed by a gland 17. When the pump 10 is in operation, the hot oil in the space 12 exists under the same pressure as the oil discharged through the outlet 20 of the pump. This pressure in some instances may be as high as 2000 pounds per square inch, and the packing device 15, to seal against such pressure, would have to be kept continuously tight, with the result that there would be a rapid wear of the packing rings 16. To reduce the liquid pressure to which the packing device 15 is subjected, the pressure relieving space 14 is connected by means of piping 21 with the intake space 22 of the pump 10, thereby reducing the pressure in the space 14 to the same pressure as exists in the space 22, which may be 200 pounds per square inch or less.

As best shown in Fig. 2, the sealing device 11 comprises a rotary part 23 which is preferably in the form of a sleeve mounted on the shaft 24 of the pump and held in place against a collar 25 on the shaft 24 by means of a sleeve 26 which may be threaded on the shaft 24 and may pass through the packing device 15, as shown in Fig. 1. In the form of the device shown, the rotary part 23 has a cylindrical face 27 of large diameter adjacent the front end 28 thereof, it being assumed that the front end of this member 23 and the front end of each other part of the device to be now described is that end thereof which faces or is disposed toward the zone of high pressure fluid against which the throttle or sealing device is to act, namely, the space 12 of the pump

10. The rotary member 23 has a cylindrical face 30 of relatively small diameter disposed toward the rearward end 31 thereof, and accordingly toward the low pressure zone formed by the space 14 of the pump 10. The relatively large and small cylindrical faces 27 and 30 are connected at substantially the center of the member 23 by an intermediate annular face 32 which may be conical as shown.

In a position overlapping the rotary part 23, and preferably substantially surrounding the same, is a stationary member 33 having a body 34 with a counterbore 35 facing forwardly therein, there being a ring 36 secured to the leftward or forward part of the body 34 by screws 37, the inner portion 38 of the ring or plate 36 extending across the leftward or forward end of the counterbore 35 so as to provide a front end face or wall 40 for the counterbore or recess 35. The rightward or rearward end of the body 34 has a bore 41 which fits relatively closely around the small cylindrical face 30 of the rotary part 23 and is consequently of smaller diameter than the opening 42 through the ring 36. The rear end wall 43 of the recess 35 is accordingly of greater radial dimension than the front end wall 40 of the recess.

The body 34 preferably has a flange 44 with openings 45 therein through which the screws 37 may be passed for the purpose of holding the sealing device 11 in an opening 50 in the dividing wall 51 between the high pressure space 12 and the pressure relieving space 14 of the pump 10. Within the recess 35 and around the intermediate portion of the rotary part 23, an axially elongated sealing ring 56 is placed, this sealing ring 56 having a bore 57 at its leftward or forward end corresponding to but slightly greater than the diameter of the cylindrical face 27 of the rotary part 23, and having a bore 58 at its rearward or rightward end corresponding in diameter to the bore 41 of the body 34. The bores 57 and 58 of the ring member 56 are connected by a sloping annular face 60 which is spaced rightwardly from the annular face 32 of the member 23 when the parts of the sealing device are disposed in their normal operating positions as shown in Figs. 2 and 4.

To minimize leakage of fluid through the interior of the ring member 56, a packing means is employed, such packing means consisting of a metal piston ring 61 mounted in a groove formed in one of the cooperating members 23 or 56, such groove being preferably the groove 62 shown in the part 23 and being preferably intermediate the ends of the cylindrical face 27 of the part 23. Fluid under high pressure from the chamber 12 of the pump 10 passes outwardly or rightwardly into the leftward end of the bore 57. A portion of this high pressure fluid passes into the groove 62 along the leftward side of the ring 61 and then into the bottom of the groove 62 under the ring 61 so as to act rightwardly and outwardly to hold the ring 61 against the rightward wall of the groove 62 and against the wall surface of the member 56 forming the large bore 57. This produces a frictional engagement of the ring with the rightward wall of the groove 62 and with the sealing member 56, which frictional engagement causes the ring member 56 to rotate with the rotary part 23 in the annular recess 35.

The leftward or forward end of the ring 56 has an end face 64 to cooperate with the front end wall 40 of the stationary member 33, and at the rightward or rearward end of the ring 56 is provided an annular face 65 in facing relation to the inner portion of the rear end wall 43. The axial dimension of the ring 56, between the faces 64 and 65, is slightly less than the axial dimension between the walls 40 and 43 of the recess 35. Outside of the annular face 65, the rearward end of the sealing ring 56 is relieved or stepped, as shown, so as to provide a radial annular face 68 confronting the wall 43 and defining an annular fluid or pressure chamber 69 which communicates with a tubular space 75 between the outer cylindrical surface of the ring member 56 and the cylindrical wall of the recess 35.

The operation of the sealing device is as follows: Fluid under pressure from the high pressure zone 12 enters the bore 42 of the plate 36 and forces rightwardly against the leftward end of the sealing ring 56, thereby moving the sealing ring 56 rightwardly in the recess 35. The fluid under pressure then passes radially outwardly between the front end wall 40 of the recess 35 and the front face 64 of the sealing member 56, and then passes rightwardly in the annular space 75 around the sealing ring 56 to the annular pressure chamber 69 at the rightward end of the member 56, wherein it exerts a pressure leftwardly or forwardly against the sealing member 56 which is preferably of the same size as the end face 64 of the sealing ring 56. The pressures on the ends of the sealing ring 56 now become substantially balanced, and as the fluid under pressure forces its way past the annular face 65 at the rightward end of the sealing member 56, the sealing member 56 is moved leftwardly in the recess 35 to a substantially centralized position between the end walls of the recess. The area of the sealing member 56 presented rightwardly, that is, the annular faces 65 and 68, is greater than the area presented leftwardly, namely, the annular face 64.

We have found that in a sealing device of this general type, there is a tendency for the ring member 56 to become locked on the member 23, where the sealing device is used in a high pressure hot oil pump, this locking being caused partly by the accumulation of a carbon deposit between the wall of the bore 57 and the cylindrical face 27 of the rotary member 23, and by the great pressure with which the ring 61 is forced outwardly against the ring member 56 by pressure of fluid in the groove 62. With changes in temperature, there is a small change in the length of the shaft 24, with the result that the rotary member 23 is moved axially. If the member 23 cannot move relatively freely within the ring member 56, the ring member 56 will be carried forcibly into engagement with an end wall of the recess 35. To prevent the locking of the ring member 56 on the rotary member 23, we have provided a means whereby a small continuous flow of fluid is conducted through the bore 57 of the member 56 and along the cylindrical face 27 of the rotary member 23, to perform a continuous washing action so that the accumulation of a carbon deposit will not occur.

This effect we prefer to produce by forming shallow passages between the outer face of the piston ring 61 and the wall of the bore 57, through which a small flow of oil may constantly pass. These shallow passages are preferably formed by shallow grooves 70 cut in axial direction across the outer circumferential face of the piston ring 61, as shown in Fig. 3, the depth of these grooves being only a few thousandths of an inch, for example, approximately three thousandths, and being arcuate with lands 71 left therebetween to engage the surface of the member 56 constituting the bore 57. In addition to permitting a small flow of fluid to pass continuously through the bore 57 of the ring member 56, the passages 70 have the additional function of reducing the pressure with which the piston ring 61 is pressed outwardly against the ring member 56. The pressure of the fluid passing rightwardly through the passages 70 acts inwardly against the bottom walls of such passages, and such inward pressure partly offsets the outward pressure exerted on the piston ring 61 by fluid in the bottom of the grooves 62.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. A sealing device of the character described, for use with a pair of members having relative rotation, for use between a high pressure zone and a low pressure zone, including: a rotary part having a large diameter cylindrical outer face at the end thereof toward said high pressure zone and a small diameter cylindrical outer face at the end thereof toward said low pressure zone, said cylindrical faces being connected by an intermediate annular face; a stationary member around said rotary part, said member having an annular recess facing said rotary part in a position surrounding said intermediate annular face and overlapping said cylindrical faces of said rotary part, said stationary member having a front end wall for said recess disposed toward said high pressure zone and a rear end wall for said recess disposed toward said low pressure zone; and a sealing ring in said recess, said sealing ring having a stepped bore corresponding in diameter at its front and rear ends to the diameters of said cylindrical outer faces of said rotary part, and said sealing ring having an annular front face at its forward end to cooperate with said front end wall of said recess and an annular rear face at its rearward end of substantially the same size as said rear end wall of said recess to cooperate with said rear end wall of said recess, there being an annular pressure chamber formed between the rear end of said sealing ring and said rear end wall of said recess, and a passage from said pressure chamber to the forward end of said recess through which fluid that has passed the front face of said sealing ring may flow to said pressure chamber and act in said pressure chamber to force said sealing ring toward said front end wall of said recess, there being a piston ring operative between said sealing ring and said rotary part, said piston ring having shallow grooves across the outer face thereof through which fluid may pass.

2. A sealing device of the character described, for use between a high pressure zone and a low pressure zone, including: a rotary part having an outer annular face with a piston ring groove therein; a stationary member around said rotary part, having an annular recess facing said annular face of said rotary part; a sealing ring in said recess, said sealing ring fitting relatively closely around said annular face of said rotary part and having a rearwardly presented area greater than its forwardly presented area; and a piston ring in said piston ring groove of said rotary part adapted to engage said sealing ring and said rotary part, said piston ring having shallow grooves across the outer face thereof through which fluid may pass in small quantity from said high pressure zone to said low pressure zone.

3. A seal of the character described, including: a primary member having an annular face; a secondary part in overlapping relation to said primary member and having an annular recess therein facing said annular face of said primary member; a ring member in said recess, said ring member being axially movable relative to said primary member and rotatable relative to said secondary part, there being a piston ring groove in one of said members facing the other of said members; and a piston ring in said groove having a series of spaced projections in engagement with the face of said other of said members, there being spaces in the face of said piston ring from one end to the other thereof and between said projections through which fluid may pass in axial direction.

GEO. E. BIGELOW.
ARTHUR R. WEIS.